US012572154B2

(12) United States Patent
Vinod et al.

(10) Patent No.: US 12,572,154 B2
(45) Date of Patent: Mar. 10, 2026

(54) SYSTEM AND METHOD FOR CONTROLLING MOTION OF ONE OR MORE DEVICES

(71) Applicants:Mitsubishi Electric Research Laboratories, Inc., Cambridge, MA (US); Mitsubishi Electric Corporation, Tokyo (JP)

(72) Inventors: Abraham Puthuvana Vinod, Braintree, MA (US); Sleiman Safaoui, Dallas, AL (US); Ankush Chakrabarty, Bedford, AL (US); Rien Quirynen, Bedford, AL (US); Nobuyuki Yoshikawa, Tokyo (JP); Stefano Di Cairano, Newton, MA (US)

(73) Assignees: Mitsubishi Electric Research Laboratories, Inc.; Mitsubishi Electric Corporation, Tokyo (JP)

(*) Notice: Subject to any disclaimer, the term of this patent is extended or adjusted under 35 U.S.C. 154(b) by 378 days.

(21) Appl. No.: 18/049,293

(22) Filed: Oct. 25, 2022

(65) Prior Publication Data

US 2023/0367336 A1 Nov. 16, 2023

Related U.S. Application Data

(60) Provisional application No. 63/364,650, filed on May 13, 2022.

(51) Int. Cl.
| | |
|---|---|
| *G05D 1/00* | (2024.01) |
| *B64C 39/02* | (2023.01) |
(Continued)

(52) U.S. Cl.
CPC ......... *G05D 1/1064* (2019.05); *B64C 39/024* (2013.01); *G05D 1/104* (2013.01);
(Continued)

(58) Field of Classification Search
CPC .... G05D 1/1064; G05D 1/104; B64C 39/024; G06F 17/11; B64U 2201/102; G06N 3/08
(Continued)

(56) References Cited

U.S. PATENT DOCUMENTS

| | | | |
|---|---|---|---|
| 12,037,013 B1 * | 7/2024 | Linscott | ................. G06N 20/00 |
| 2019/0329768 A1 * | 10/2019 | Shalev-Shwartz | ..... G05D 1/617 |
(Continued)

FOREIGN PATENT DOCUMENTS

| | | |
|---|---|---|
| WO | 2021152047 | 8/2021 |

OTHER PUBLICATIONS

K. P. Wabersich, L. Hewing, A. Carron and M. N. Zeilinger, "Probabilistic Model Predictive Safety Certification for Learning-Based Control," in IEEE Transactions on Automatic Control, vol. 67, No. 1, pp. 176-188, Jan. 2022, doi: 10.1109/TAC.2021.3049335.
(Continued)

*Primary Examiner* — Tiffany P Young
*Assistant Examiner* — John D Holman
(74) *Attorney, Agent, or Firm* — Gene Vinokur

(57) ABSTRACT

The present disclosure provides a system and a method for controlling a motion of a device from an initial state to a target state in an environment having obstacles that form constraints on the motion of the device. The method includes executing a learned function trained with machine learning to generate a feasible or infeasible trajectory connecting the initial state of the device with the target state of the device while penalizing an extent of violation of at least some of the constraints to produce an initial trajectory. The method further includes solving a convex optimization problem subject to the constraints to produce an optimal trajectory that minimizes deviation from the initial trajectory and controlling the motion of the device according to the optimal trajectory.

12 Claims, 18 Drawing Sheets

(51) Int. Cl.
    *G06F 17/11*           (2006.01)
    *G06N 3/08*            (2023.01)

(52) U.S. Cl.
    CPC .............. *G06F 17/11* (2013.01); *G06N 3/08*
               (2013.01); *B64U 2201/102* (2023.01)

(58) Field of Classification Search
    USPC ........................................................ 701/301
    See application file for complete search history.

(56)               References Cited

U.S. PATENT DOCUMENTS

| | | | | |
|---|---|---|---|---|
| 2021/0316763 | A1* | 10/2021 | Domahidi | B60W 40/105 |
| 2022/0055651 | A1* | 2/2022 | Baric | G05D 1/646 |
| 2023/0089978 | A1* | 3/2023 | Pulver | G05D 1/0238 |
| | | | | 701/26 |

OTHER PUBLICATIONS

Ingy ElSayed-Aly, Suda Bharadwaj, Christopher Amato, Rudiger Ehlers, Ufuk Topcu, and Lu Feng. 2021. Safe Multi-Agent Reinforcement Learning via Shielding. In Proceedings of the 20th International Conference on Autonomous Agents and MultiAgent Systems (AAMAS '21). International Foundation for Autonomous Agents and Multiagent Systems, Richland, SC, 483-491.

M. Srinivasan, A. Chakrabarty, R. Quirynen, N. Yoshikawa, T. Mariyama, and S. Di Cairano, "Fast multi-robot motion planning via imitation learning of mixed-integer programs," in Proceedings of IFAC Modeling, Estimation and Control Conference (MECC), 2021.

U.S. Appl. No. 17/407,437, "Controller for Optimizing Motion Trajectory to Control Motion of One or More Devices", filed on Aug. 20, 2021, pp. 1-82.

* cited by examiner

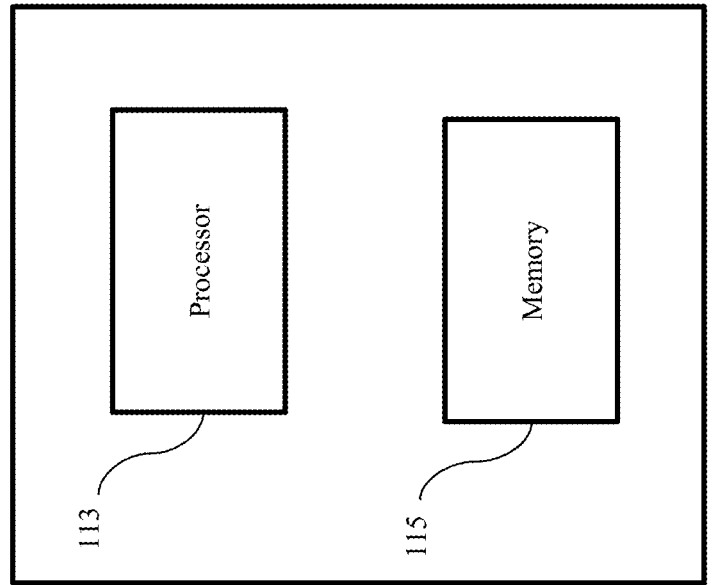
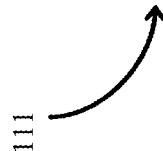
FIG. 1B

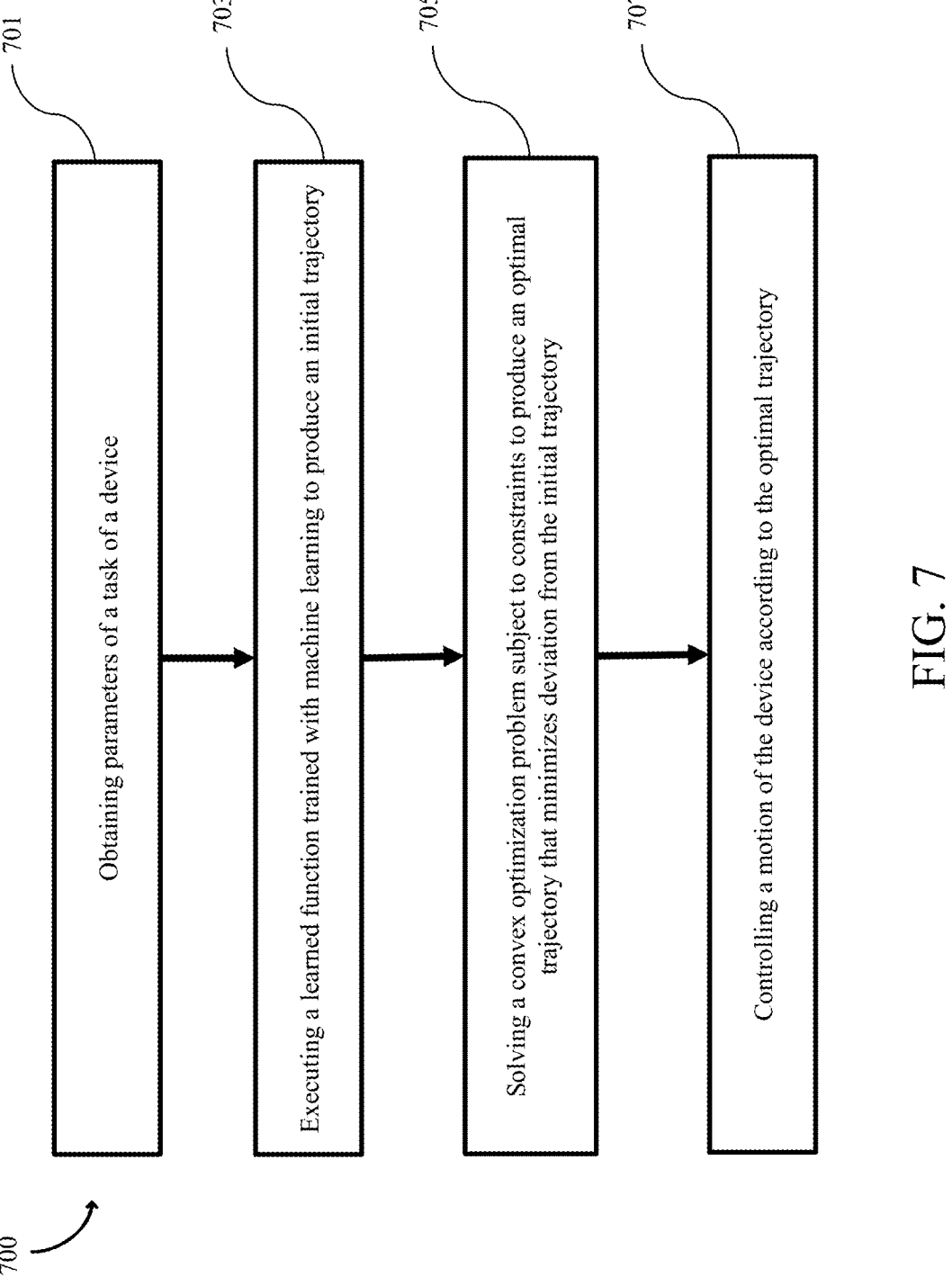

701 — Obtaining parameters of a task of a device

703 — Executing a learned function trained with machine learning to produce an initial trajectory 705 — Solving a convex optimization problem subject to constraints to produce an optimal trajectory that minimizes deviation from the initial trajectory 707 — Controlling a motion of the device according to the optimal trajectory

SYSTEM AND METHOD FOR CONTROLLING MOTION OF ONE OR MORE DEVICES

TECHNICAL FIELD

The present disclosure relates generally to motion planning of devices, and more particularly to a system and a method for controlling motion of one or more devices from an initial state to a target state in an environment having obstacles.

BACKGROUND

Optimal motion planning of devices, in a workspace with obstacles, to achieve specific positions while avoiding collisions with the obstacles and between themselves has multiple applications, such as wheeled ground robots, aircraft on ground, and flying drones. A task in such motion planning problems comprises of constraints on a motion trajectory of the devices. The constraints can encode requirements on a target position of each of the devices, avoidance of collision with each other and other static/moving obstacles in the workspace. For instance, aerial drones can be tasked to reach certain positions to inspect a structure while avoiding collisions with other structures and between themselves. An aircraft can be tasked to move on airport grounds to reach its assigned runaway or gate while avoiding other aircrafts, carts, and structures. Mobile robots on a factory floor can be tasked to reach their work positions or positions where they need to unload cargo while avoiding work areas, human workers, and other robots.

Such motion planning problems are challenging because admissible workspace and a set of device configurations at which all constraints pertaining to the task are satisfied, is typically non-convex. Thus, motion planning problem is a non-convex optimization problem. As used herein, the motion planning problem refers to determination of a motion trajectory of the device for performing the task. However, solving the non-convex optimization problem requires a significant amount of computation and memory resources.

Motion planners are used to solve the non-convex optimization problem. An example of a non-convex optimization-based motion planner is using mixed-integer programming (MIP) approach. The MIP approach involves solving a constrained optimization problem, where a cost function is minimized or maximized subject to some constraints, some optimization variables are real-valued (continuous variables), and others are integer or binary-valued (discrete-variables). In particular, mixed-integer linear/quadratic programming (MILP/MIQP) can be applied when the motion trajectories of the devices can be described by linear dynamics and the obstacles can be represented, possibly in a conservative way, such as by polygons (i.e., by linear inequalities). The MILP/MIQP is known to terminate in finite time, and hence bounds on time to compute a solution can be derived. However, the computation is still complex (NP-Hard) and may incur significant computation cost. Thus, there is a need for a solution that can achieve optimal planning of the motion trajectory of the devices in the workspace with obstacles, while using limited computational and memory resources.

SUMMARY

It is an objective of some embodiments to provide a system and a method for controlling a motion of a device from an initial state to a target state in an environment. It is also an objective of some embodiments to determine a motion trajectory of the device to perform a task, for example, reaching the target state. The state of the device may include one or a combination of a position of the device, an orientation of the device, and a velocity of the device. The environment includes obstacles. The device may be an autonomous vehicle, such as a mobile robot, an aerial vehicle, a water surface vehicle, or an underwater vehicle. The performance of the task requires satisfaction of constraints on motion of the device. In other words, the performance of the task is subject to the constraints. Examples of such constraints include reaching a target position, avoiding collision with the obstacles, avoiding collision with other devices, moving the device such that a state of the device (e.g., position) is within a pre-defined set of admissible states of the device, and the like. For instance, a drone can be tasked to reach certain positions to inspect a structure while avoiding collisions with parts of the structure.

Some embodiments are based on the recognition that the admissible states and a set of device configurations/states at which all the constraints are satisfied, is typically non-convex. Thus, motion planning problem is a non-convex optimization problem. As used herein, the motion planning problem refers to determination of the motion trajectory of the device for performing the task. However, solving the non-convex optimization problem requires a significant amount of computation and memory resources.

Some embodiments are based on the recognition that the admissible states and a set of device configurations/states at which all the constraints are satisfied, is typically non-convex. Thus, motion planning problem is a non-convex optimization problem. As used herein, the motion planning problem refers to determination of the motion trajectory of the device for performing the task. However, solving the non-convex optimization problem requires a significant amount of computation and memory resources.

It is an object of some embodiments to reduce the computational burden of the non-convex optimization problem subject to the constraints, using machine learning. Some embodiments are based on understanding that various learned functions, such as neural networks, can be trained offline by a training system having sufficient computational requirements and executed online by a controller having limited computational capabilities.

However, replacing the non-convex optimization problem subject to the constraints with such a learned function is problematic because of nature of the machine learning. Specifically, the machine learning is related to computational statistics, which is probabilistic in nature. As a result, the learned functions, such as neural networks are not equipped to manage hard constraints but designed to satisfy the constraints with some probabilities. This notion is analogous or a direct replication of notion of soft constraints, when violation of the constraints is penalized but not prohibited.

Hence, it is impossible or at least impractical to train a neural network that provides a solution of the non-convex optimization problem subject to the constraints as hard constraints. It is possible to find such a solution with a high likelihood but under a condition of enough offline training data closely approximating online environment, which is impractical. As the motion planning and control require satisfaction of the constraints, some embodiments are based on the realization that it is possible to use the learned function to determine an initial solution to the non-convex optimization problem, i.e., an initial trajectory of the device, subject to the soft constraints. However, such an initial trajectory needs to be further processed to ensure that a final trajectory satisfies the constraints.

Some embodiments are based on a recognition that given an initial trajectory that satisfies the constraints, it is possible to optimize the initial trajectory to also ensure the constraints. Moreover, such an optimization would be convex. In other words, having the initial trajectory can transform the non-convex optimization problem subject to the hard constraints into a convex optimization problem subject to the hard constraints when the initial trajectory is feasible. However, the initial trajectory generated by the learned function trained subject to the soft constraints does not guarantee feasibility and, in general, cannot guarantee such transformation.

However, some embodiments are based on the realization that the transformation from the non-convex optimization problem into the convex optimization problem is due to a possibility of convexification around the initial trajectory providing a union of a time-varying collection of convex regions including the target state. Each convex region is generated by considering a part of the initial trajectory and facets of the obstacles. Hence, the initial trajectory does not have to be feasible. In contrast, the initial trajectory may be infeasible as long as the convex regions include the initial state and the target state.

Some embodiments are based on intuition supported by numerous tests and experiments, which learned function trained to minimize a rate of violation of the constraints generates the initial trajectories suitable for such transformation. An example of such training is reinforcement learning (RL), which is an area of machine learning concerned with how intelligent devices ought to take actions in the environment in order to maximize a cumulative reward.

Further, some embodiments are based on recognition that stochastic uncertainty may be present in dynamics of the device due to nonlinearities, actuation mismatch, and unmodelled phenomena, and in the positions of the devices and the obstacles due to sensing limitations. In such a case, where the device dynamics include the stochastic uncertainties, the constraints are replaced by probabilistic safety constraints (also referred to as chance constraints). The optimization-based safety filter is configured to enforce the probabilistic safety constraints as hard constraints to ensure safety with a high probability. In an embodiment, the optimization-based safety filter enforces the probabilistic safety constraints based on convex chance approximations of the probabilistic safety constraints.

Accordingly, one embodiment discloses a controller for controlling a motion of a device from an initial state to a target state in an environment having obstacles forming constraints on the motion of the device. The controller comprises a processor; and a memory having instructions stored thereon that, when executed by the processor, cause the controller to: execute a learned function trained with machine learning to generate a feasible or infeasible trajectory connecting the initial state of the device with the target state of the device while penalizing an extent of violation of at least some of the constraints to produce an initial trajectory; solve a convex optimization problem subject to the constraints to produce an optimal trajectory that minimizes deviation from the initial trajectory; and control the motion of the device according to the optimal trajectory.

Accordingly, another embodiment discloses a method for controlling a motion of a device from an initial state to a target state in an environment having obstacles forming constraints on the motion of the device. The method comprises executing a learned function trained with machine learning to generate a feasible or infeasible trajectory connecting the initial state of the device with the target state of the device while penalizing an extent of violation of at least some of the constraints to produce an initial trajectory; solving a convex optimization problem subject to the constraints to produce an optimal trajectory that minimizes deviation from the initial trajectory; and controlling the motion of the device according to the optimal trajectory.

Accordingly, yet another embodiment discloses a non-transitory computer-readable storage medium embodied thereon a program executable by a processor for performing a method for controlling a motion of a device from an initial state to a target state in an environment having obstacles forming constraints on the motion of the device. The method comprises executing a learned function trained with machine learning to generate a feasible or infeasible trajectory connecting the initial state of the device with the target state of the device while penalizing an extent of violation of at least some of the constraints to produce an initial trajectory; solving a convex optimization problem subject to the constraints to produce an optimal trajectory that minimizes deviation from the initial trajectory; and controlling the motion of the device according to the optimal trajectory.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1B illustrates a block diagram of a controller for controlling a motion of the device from an initial state to a target state in an environment, according to an embodiment of the present disclosure.

FIG. 7 shows a block diagram of a method for controlling the motion of the device from the initial state to the target state in the environment having obstacles, according to an embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
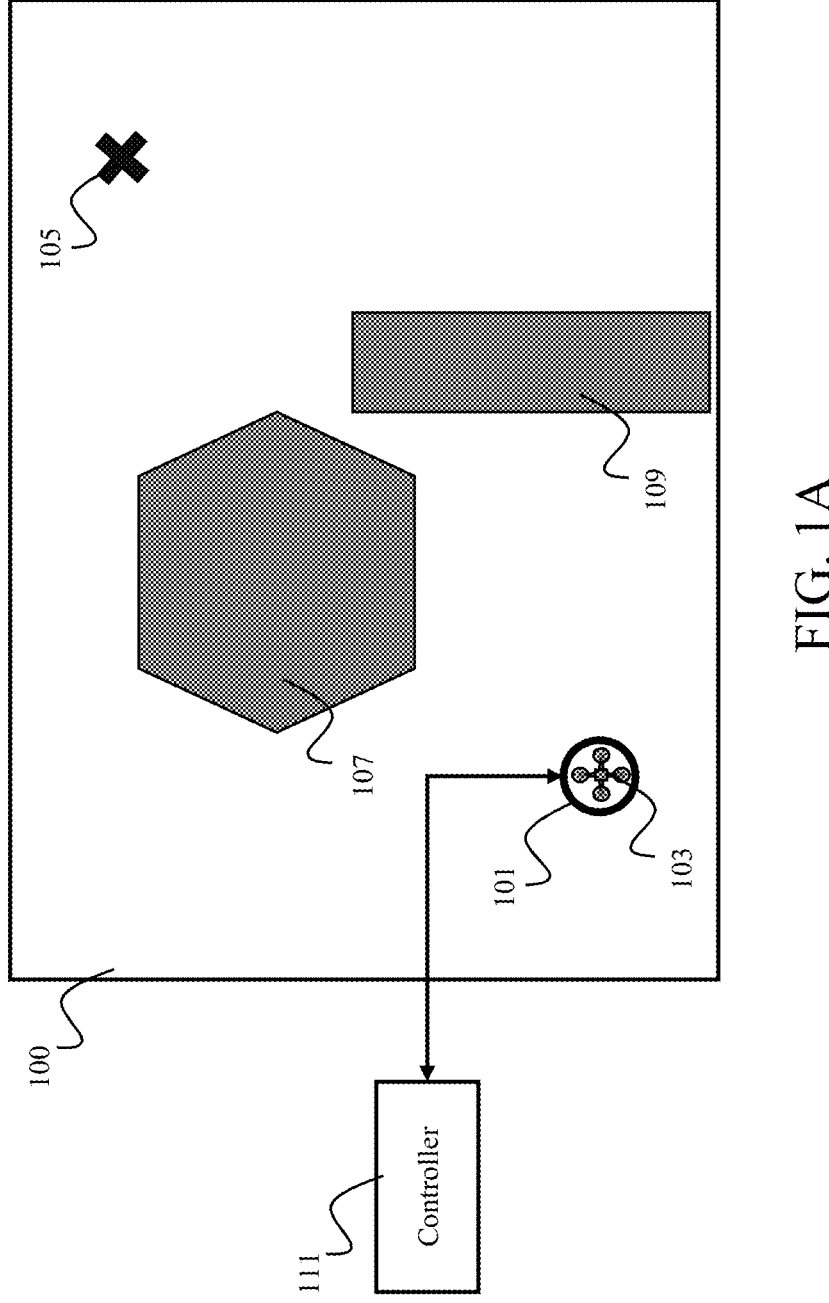
FIG. 1A illustrates an example environment where a device is controlled, according to an embodiment of the present disclosure.

FIG. 1A illustrates an example of environment 100 where a device 101 is controlled, according to an embodiment of the present disclosure. It is an objective of some embodiments to control a motion of the device 101 from an initial state 103 to a target state 105 in the environment 100. It is also an objective of some embodiments to determine a motion trajectory of the device 101 to perform a task, for example, reaching the target state 105. The state of the device 101 may include one or a combination of a position of the device 101, an orientation of the device 101, and a velocity of the device 101.

The environment 100 includes obstacles 107 and 109. The device 101 may be an autonomous vehicle, such as a mobile robot, an aerial vehicle, a water surface vehicle, or an underwater vehicle. The performance of the task requires satisfaction of constraints on the motion of the device 101. In other words, the performance of the task is subject to the constraints. Examples of such constraints include reaching the target state 105, avoiding collision with the obstacles 107 and 109 (i.e., a device-obstacle collision avoidance constraint), avoiding collision with other devices (i.e., an inter-device collision avoidance constraint), moving the device 101 such that the state of the device 101 (e.g., position) is within a pre-defined set of admissible states of the device 101 (i.e., a keep-in constraint), and the like. For instance, a drone can be tasked to reach certain positions to inspect a structure while avoiding collisions with parts of the structure.

To achieve aforesaid objectives, some embodiments provide a controller 111 for controlling the motion of the device 101 from the initial state 103 to the target state 105 in the environment 100.

FIG. 1B shows a block diagram of the controller 111, according to an embodiment of the present disclosure. The controller 111 includes a processor 113 and a memory 115. The processor 113 may be a single core processor, a multi-core processor, a computing cluster, or any number of other configurations. In some embodiments, the processor 113 is an embedded processing unit (EPU). The memory 115 may include random access memory (RAM), read only memory (ROM), flash memory, or any other suitable memory systems. Additionally, in some embodiments, the memory 115 may be implemented using a hard drive, an optical drive, a thumb drive, an array of drives, or any combinations thereof. In an embodiment, the controller 111 is communicatively coupled to the device 101. For instance, the controller 111 may be remotely connected to the device 101, via a network. In an alternate embodiment, the controller 111 is embedded in the device 101.

Some embodiments are based on the recognition that the admissible states and a set of device configurations/states at which all the constraints are satisfied, is typically non-convex. Thus, motion planning problem is a non-convex optimization problem. As used herein, the motion planning problem refers to determination of the motion trajectory of the device 101 for performing the task. However, solving the non-convex optimization problem requires a significant amount of computation and memory resources.

It is an object of some embodiments to reduce the computational burden of the non-convex optimization problem subject to the constraints, using machine learning. Some embodiments are based on an understanding that various learned functions associated with machine learning, such as neural networks, can be trained offline by a training system having sufficient computational requirements and executed online by a controller having limited computational capabilities.

However, replacing the non-convex optimization problem subject to the constraints with such a learned function is problematic because of nature of the machine learning. Specifically, the machine learning is related to computational statistics, which is probabilistic in nature. As a result, the learned functions, such as neural networks are not equipped to manage hard constraints but designed to satisfy the constraints with some probabilities. A hard constraint refers to a constraint that "must" be satisfied at all times. However, the probabilistic notion of constraints is analogous or a direct replication of notion of soft constraints, when violation of the constraints is penalized but not prohibited.

Hence, it is impossible or at least impractical to train a neural network that provides a solution of the non-convex optimization problem subject to the constraints as hard constraints. It is possible to find such a solution with a high likelihood but under a condition of enough offline training data closely approximating online environment, which is impractical. As the motion planning and control require satisfaction of the constraints, some embodiments are based on the realization that it is possible to use the learned function to determine an initial solution to the non-convex optimization problem, i.e., an initial trajectory of the device 101, subject to the soft constraints. However, such an initial trajectory needs to be further processed to ensure that a final trajectory satisfies the constraints.

Some embodiments are based on a recognition that given an initial trajectory that satisfies the constraints, it is possible to optimize the initial trajectory to also ensure the satisfaction of constraints. Moreover, such an optimization would be convex. In other words, having the initial trajectory can transform the non-convex optimization problem subject to the hard constraints into a convex optimization problem subject to the hard constraints when the initial trajectory is feasible. However, the initial trajectory generated by the learned function trained subject to the soft constraints does not guarantee feasibility and, in general, cannot guarantee such transformation.

However, some embodiments are based on the realization that the transformation from the non-convex optimization problem into the convex optimization problem is due to a possibility of convexification around the initial trajectory providing a union of a time-varying collection of convex regions including the target state 105. Hence, the initial trajectory does not have to be feasible. In contrast, the initial trajectory may be infeasible as long as the convex regions include the initial state 103 and the target state 105.

Figure 1C:
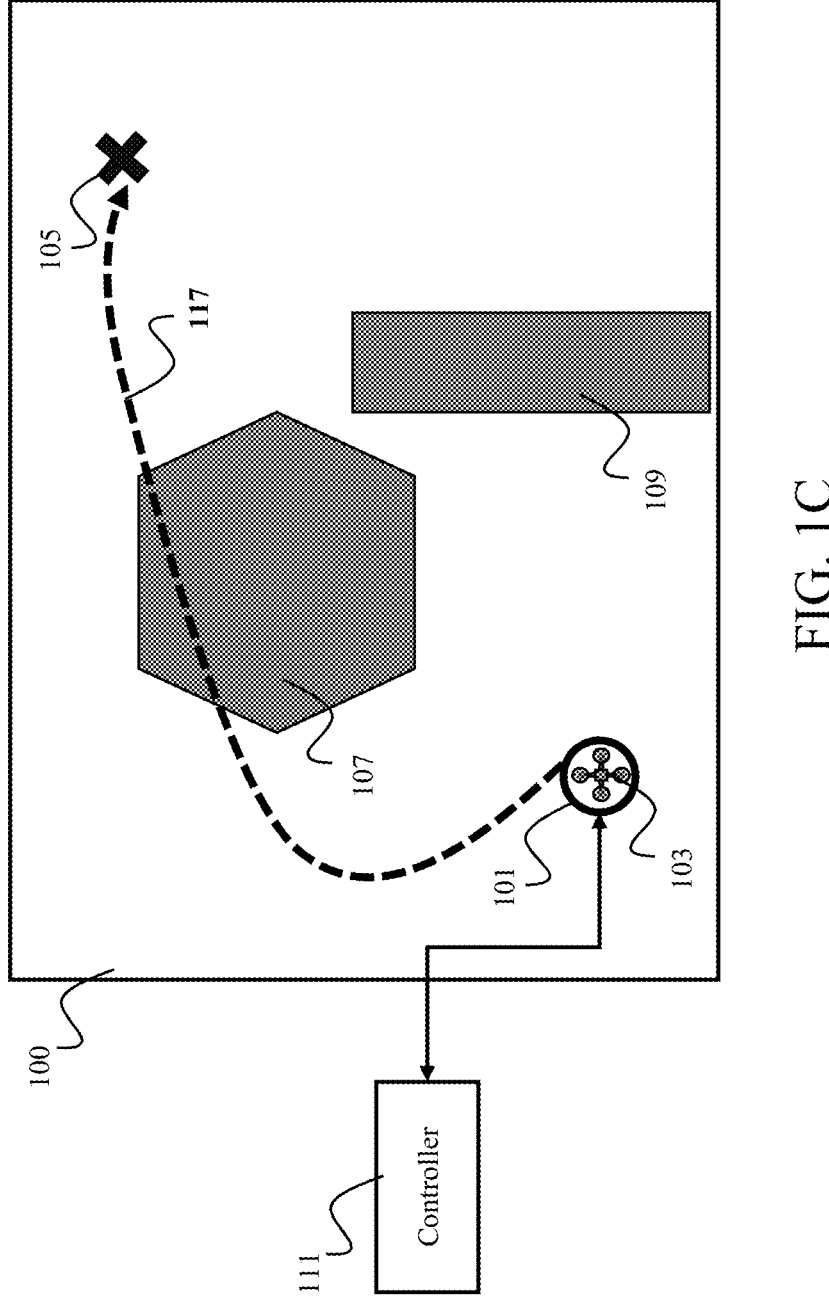
FIG. 1C illustrates an example initial trajectory, according to an embodiment of the present disclosure.

FIG. 1C illustrates an example of initial trajectory 117, according to an embodiment of the present disclosure. The processor 113 (shown in FIG. 1B) is configured to execute the learned function to produce the initial trajectory 117 connecting the initial state 103 with the target state 105 while penalizing an extent of violation of at least some of the constraints. The learned function may be stored in the memory 115 (shown in FIG. 1B) of the controller 111. According to an embodiment, the learned function is a neural network trained using a reinforcement learning based on a reward function. The reward function penalizes the extent of violation of the constraints. The reward function returns higher values when the initial trajectory 117 satisfies the constraints as compared to when the constraints are violated (i.e., the reward function penalizes upon violation of the constraints). In an embodiment, an algorithm such as a proximal policy optimization is used to determine an initial trajectory that maximizes the reward function.

The initial trajectory 117 is an infeasible trajectory as it overlaps with the obstacle 107. Further, given the initial trajectory 117, the processor 113 executes an optimization-based safety filter to determine a non-convex collision-free region.

Figure 1D:
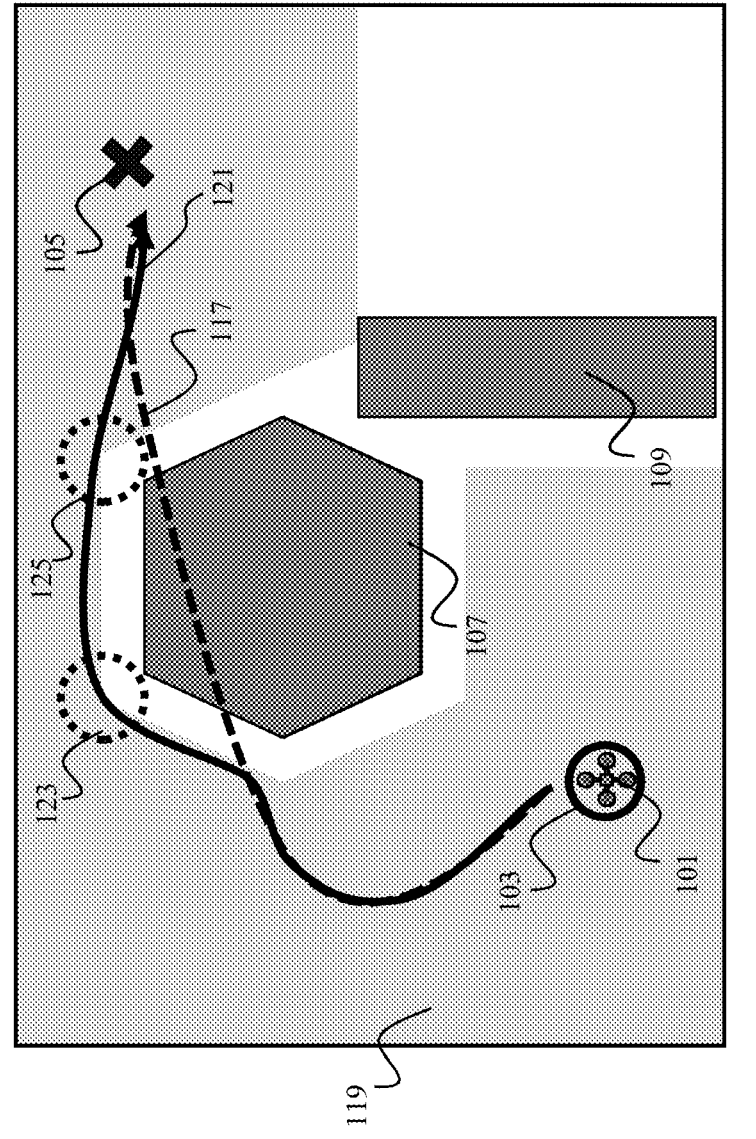
FIG. 1D illustrates a non-convex collision-free region determined by executing an optimization-based safety filter, according to an embodiment of the present disclosure.

FIG. 1D shows a non-convex collision-free region 119 determined by executing an optimization-based safety filter, according to an embodiment of the present disclosure. The optimization-based safety filter may be stored in the memory 115 (shown in FIG. 1B) of the controller 111. Further, the processor 113 (shown in FIG. 1B) solves the convex optimization problem subject to the hard constraints to produce an optimal trajectory 121 that minimizes deviation from the initial trajectory 117 and lies within the non-convex collision-free region 119. The processor 113 controls the device 101 according to the optimal trajectory 121. For example, based on the optimal trajectory 121, the controller 111 determines control inputs to actuators of the device 101 to track the optimal trajectory 121. Since the optimal trajectory lies within the non-convex collision-free region 119, the device 101, when controlled according to the optimal trajectory 121, does not overlap with the obstacles 107 and 109. For example, even when the device 101 makes tight corners 123 and 125 when executing the optimal trajectory 121, the device 101 does not overlap with the obstacle 107.

According to an embodiment, the non-convex collision-free region 119 is the union of time-varying collection of convex regions. Each convex region is generated by considering a part of the initial trajectory 117 and facets of the obstacles 107 and 109.

Figure 1E:
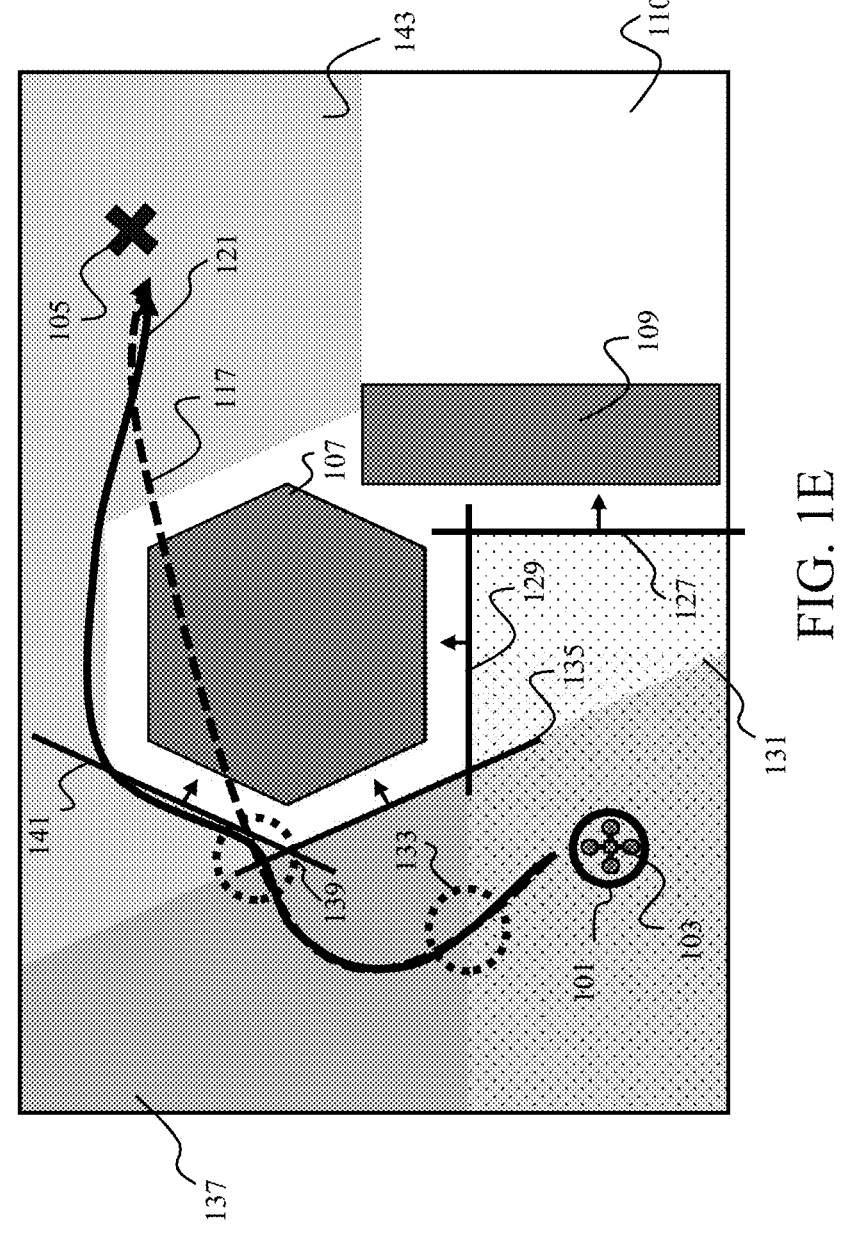
FIG. 1E illustrates an approach for generating convex regions defining the non-convex collision-free region, according to an embodiment of the present disclosure.

FIG. 1E illustrates an approach for generating convex regions defining the non-convex collision-free region 119, according to an embodiment of the present disclosure. According to an embodiment, the convex regions are generated by generating halfspaces. Specifically, as the device 101 starts at the initial state 103, the optimization-based safety filter projects a current location of the device 101 (i.e., the initial state 103) onto the obstacles 107 and 109, and results supporting halfspaces 127 and 129. Intersection of the halfspaces 127 and 129 forms a convex region 131 that includes the device 101 at the initial state 103. Based on the initial trajectory 117, the processor 113 determines a trajectory that deviates minimum from the initial trajectory 117 and maintains the device 101 in the convex region 131. As the device 101 moves along the trajectory, the supporting halfspaces are continuously updated based on the current state of the device 101. When the device 101 reaches a position 133, the supporting halfspace for the obstacle 107 changes from 129 to 135, and the convex region changes from 131 to 137. Further, when the device 101 reaches a position 139, the supporting halfspace for the obstacle 107 changes from 135 to 141, and the convex region changes from 137 to 143.

Figure 1F:
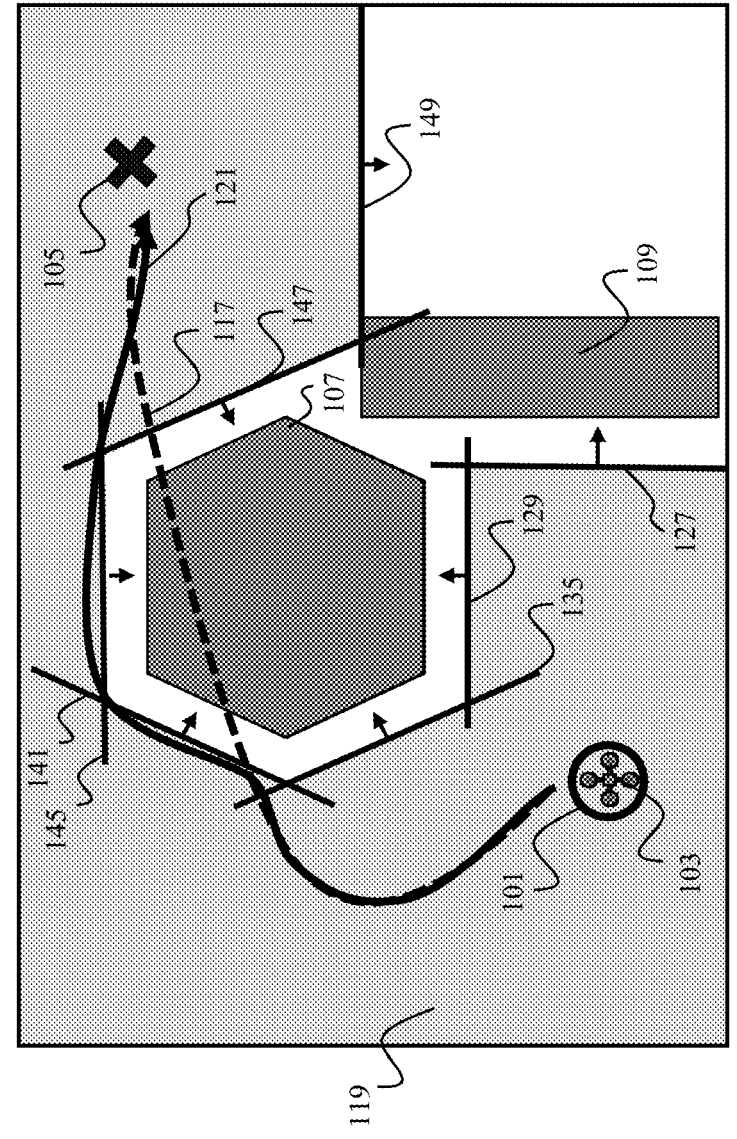
FIG. 1F illustrates multiple halfspaces generated by the optimization-based safety filter as the device navigates in the environment, according to an embodiment of the present disclosure.

FIG. 1F illustrates all the halfspaces 127, 129, 135, 141, 145, 147, and 149, generated by the optimization-based safety filter as the device 101 navigates in the environment 100, according to an embodiment of the present disclosure. The intersection of the halfspaces 127, 129, 135, 141, 145, 147, and 149 forms the convex regions 131, 137, and 143, which collectively define the non-convex collision-free region 119.

Further, some embodiments are based on realization that such a framework of motion planning (which is based on the learned function and the optimization-based safety filter) can be extended for motion planning of multiple devices, wherein each device has a respective target state.

Figure 2A:
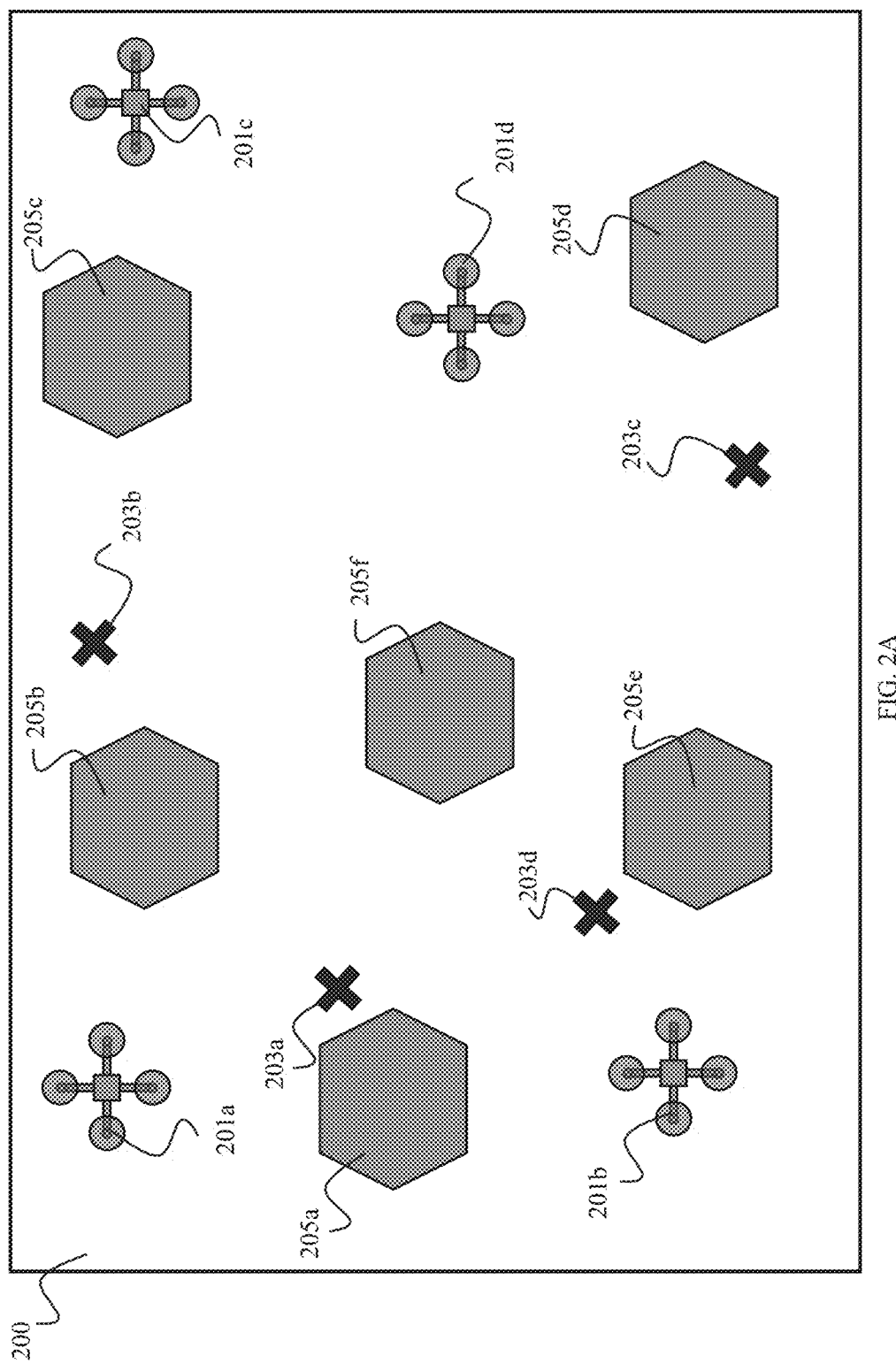
FIG. 2A illustrates an environment including multiple devices, wherein each device has a respective target state, according to an embodiment of the present disclosure.

FIG. 2A shows an environment 200 including multiple devices, wherein each device has a respective target state, according to an embodiment of the present disclosure. The devices 201*a*, 201*b*, 201*c*, and 201*d*, are required to reach their assigned target states 203*a*, 203*b*, 203*c*, and 203*d*. The environment 200 includes obstacles 205*a*, 205*b*, 205*c*, 205*d*, 205*e*, and 205*f*. It is an object of some embodiments to determine an optimal trajectory for each device that connects each device with their respective target states while avoiding collision with each other and with the obstacles 205*a*, 205*b*, 205*c*, 205*d*, 205*e*, and 201*f*.

In some embodiments, the controller 111 is executed on a remote centralized server and is communicatively coupled to each device. In such embodiments, for the motion planning of the multiple devices, the learned function is formulated for each device to produce an initial trajectory for each device, separately. However, the convex optimization problem is not solved separately for each device, the convex optimization problem is transformed into a joint-optimization problem that simultaneously determines an optimal trajectory for each device based on the respective initial trajectory. To that end, for the motion planning of the multiple devices, the controller 111 includes a number of the learned functions equal to a number of devices, and an optimization-based safety filter that simultaneously determines the optimal motion trajectory for each device by solving the joint-optimization problem. Such a motion planning of the multiple devices is advantageous because a single-device learned function is easier to train, requires less computational resources, and demonstrates superior performance as compared to training the neural network (or a model) that provides the initial trajectories for all devices simultaneously. The motion planning of the multiple devices is explained below in FIG. 2B.

Figure 2B:
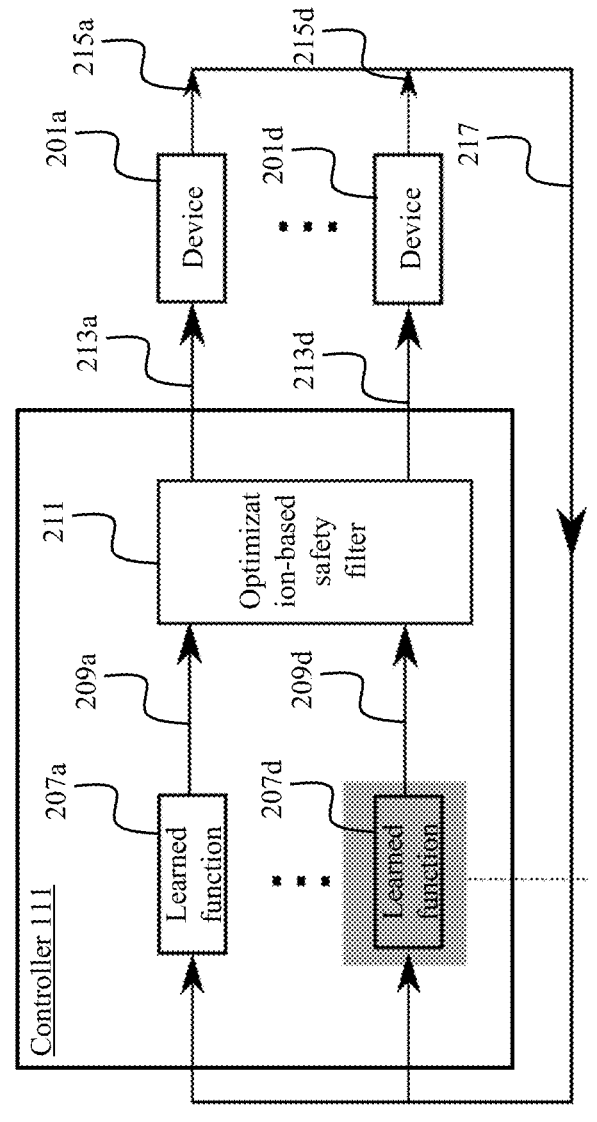
FIG. 2B illustrates a schematic for motion planning of the multiple devices, according to an embodiment of the present disclosure.

FIG. 2B shows a schematic for the motion planning of the multiple devices, according to an embodiment of the present disclosure. Learned functions 207*a*-207*d* produces initial trajectories 209*a*-209*d*, respectively. The initial trajectories 209*a*-209*d* are associated with the devices 201*a*-201*d*, respectively. The initial trajectories 209*a*-209*d* are applied to an optimization-based safety filter 211. The optimization-based safety filter 211 solves the joint-optimization problem to simultaneously determine optimal trajectories 231*a*-213*d*. The optimal trajectories 231*a*-213*d* are associated with the devices 201*a*-201*d*, respectively.

The controller 111 controls each device based on their respective optimal trajectory. In particular, the controller 111 controls each device based on a pre-determined number of states of their respective optimal trajectory. When the devices 201*a*-201*d* are controlled based on their respective optimal trajectory, the devices 201*a*-201*d* attain new states 215*a*-215*d*. The new states 215*a*-215*d* are fed back 217 to the learned functions 207*a*-207*d*, respectively. Further, the learned functions 207*a*-207*d* produces new initial trajectories based on the new states 215*a*-215*d* and the above-mentioned process is repeated.

In some alternate embodiments, for the motion planning of the multiple devices, the controller 111 is executed on each device. Such an embodiment is described below in FIG. 2C.

Figure 2C:
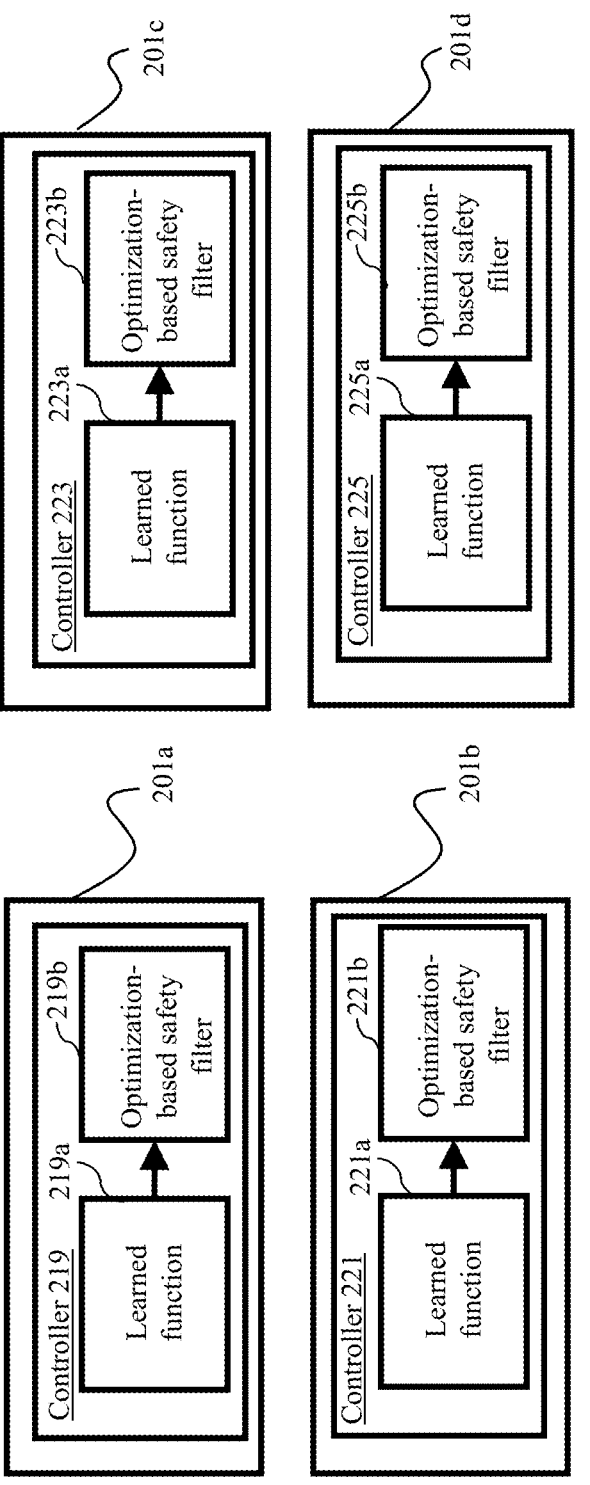
FIG. 2C illustrates a schematic for the motion planning of the multiple devices, according to an alternate embodiment of the present disclosure.

FIG. 2C shows a schematic for the motion planning of the multiple devices, according to an alternate embodiment of the present disclosure. Each of the devices 201*a*-201*d* includes a controller (similar to the controller 111). For instance, the device 201*a* includes a controller 219 including a learned function 219*a* and an optimization-based safety filter 219*b*. The learned function 219*a* is configured to produce an initial trajectory for the device 201*a*. The optimization-based safety filter 219*b* is configured to solve a convex optimization problem subject to the constraints to produce an optimal trajectory that minimizes deviation from the initial trajectory of the device 201*a*. Further, the controller 219 controls a motion of the device 201*a* based on the optimal trajectory produced for the device 201*a*.

Likewise, the device 201*b* includes a controller 221 including a learned function 221*a* and an optimization-based safety filter 221*b*, the device 201*c* includes a controller 223 including a learned function 223*a* and an optimization-based safety filter 223*b*, the device 201*d* includes a controller 225 including a learned function 225*a* and an optimization-based safety filter 225*b*. The learned function of each device produces an initial trajectory for their respective device and subsequently the optimization-based safety filter of each device produces an optimal trajectory for the corresponding device.

An implementation of the learned function, e.g., the learned function 219*a*, is described below. Consider a device (e.g., the device 101) with d-dimensional deterministic dynamics $$x(k+1)=Ax(k)+Bu(k), p(k)=Cx(k), \tag{1a}$$

a specified target position q.
A following low-level controller is defined for $$u(k)=Kx(k)+Fr(k)$$

where K is a stabilizing gain matrix that renders closed-loop system is stable, and a matrix F satisfies $C(I-(A+BK))^{-1}BF=\text{Identity}(d)$, and r(k) is a reference position command. Thus, following stabilized device dynamics is obtained:

$$x(k+1)=(A+BK)x(k)+BFr(k). \tag{1b}$$

Let $c_j$, $1 \le j \le N_O$ denotes nominal mean positions of the obstacles for all $N_O$ obstacles. The obstacles are assumed to be circles with radii $\gamma_j$, $1 \le j \le N_O$ respectively.

In some embodiments, stochastic dynamics is also considered for the device 101, $$x(k+1)=Ax(k)+Bu(k)+w(k), p(k)=Cx(k)+\eta(k), \tag{1c}$$

where a process noise w(k) and a measurement noise $\eta(k)$ are stochastic disturbances affecting the dynamics (1a) of the device 101.
Consider a deterministic Markov Decision Process (MDP) for the device 101 with above dynamics. The MDP has the following:

1. Observation space: An observation vector o(k) is defined as a concatenated vector containing the state x(k), a displacement of the device's current position to the target (p (k)−q) and to the $N_O$ static obstacles (p(k)−$c_j$), where $c_j$ denotes nominal mean positions of the obstacles for all $1 \le j \le N_O$. Thus, the position of the device p(k) is a linear transformation of the observation vector o(k).

2. Action space: An action a(k) determines a reference position as a bounded perturbation a(k) to the target position q, such that $$r(k)=q+a(k). \tag{2}$$

3. Step function: A next state x(k+1) is obtained using the closed-loop stabilized dynamics (1b).

4. Reward function: An instantaneous reward function is $$R(o(k), a(k)) = \tag{3}$$

Distance of $p(k)$ to target $q$ + Penalty on control effort $a(k)$ +

$$\left( \text{Weighted sum of } \frac{1}{\|p(k)-c_j\|^2 - \gamma_j^2} \right)$$

While the above characterization of the step function of the MDP considered closed-loop deterministic dynamics (1b), the stochastic dynamics (1c) can also be used to setup a similar step function.

Figure 3:
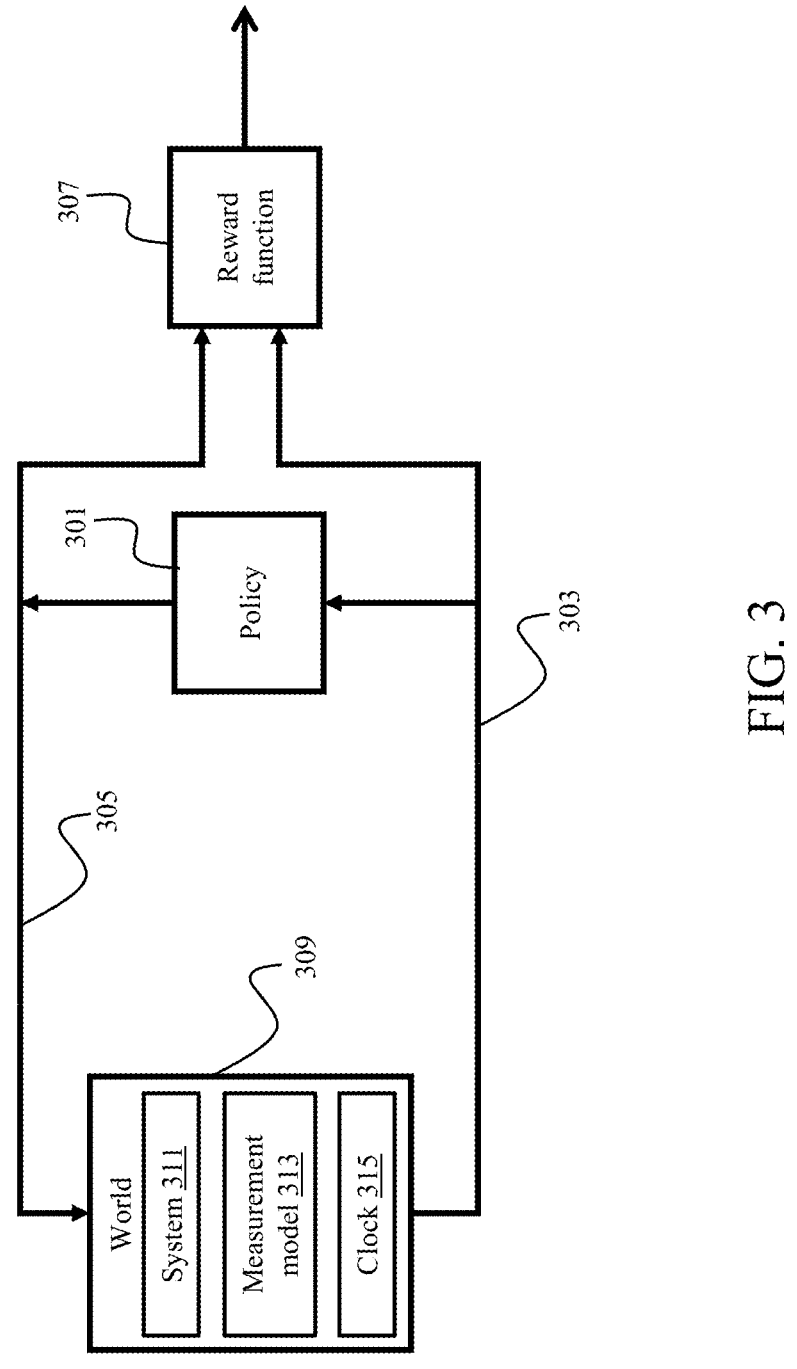
FIG. 3 illustrates a schematic of the Markov Decision Process (MDP) used in reinforcement learning, according to some embodiments of the present disclosure.

FIG. 3 shows a schematic of the MDP, according to some embodiments of the present disclosure. At every time step, a policy 301 converts an observation 303 (denoted above as o(k)) into an action 305 (denoted above as a(k)). A reward function 307 is a function of the observation 303 and the action 305, as defined in (3). A world 309 consists of a system 311, a measurement model 313, and a clock 315. The system 311 uses the step function defined based on the closed-loop dynamics (1b), a current internal state x(k), a current action a(k), and a current reference control r(k) to arrive at a next internal state x(k+1). The measurement model 313 converts a state into an appropriate observation vector. The clock 315 increments time k to k+1.

Some embodiments of the present disclosure use function approximators to characterize the policy 301. Consequently, a suitable prediction model that provides an initial trajectory (e.g., the initial trajectory 117) can be constructed. The prediction model corresponds to the learned function. The prediction model may be deterministic or stochastic and may rely on neural architectures or kernel representations. Examples of deterministic prediction models include multi-layer perceptron, convolutional neural networks, kernel regression and support vector machines, and the like. Examples of stochastic prediction models include Bayesian neural networks, neural processes, Gaussian processes, Kriging interpolation, and the like.

Figure 4:
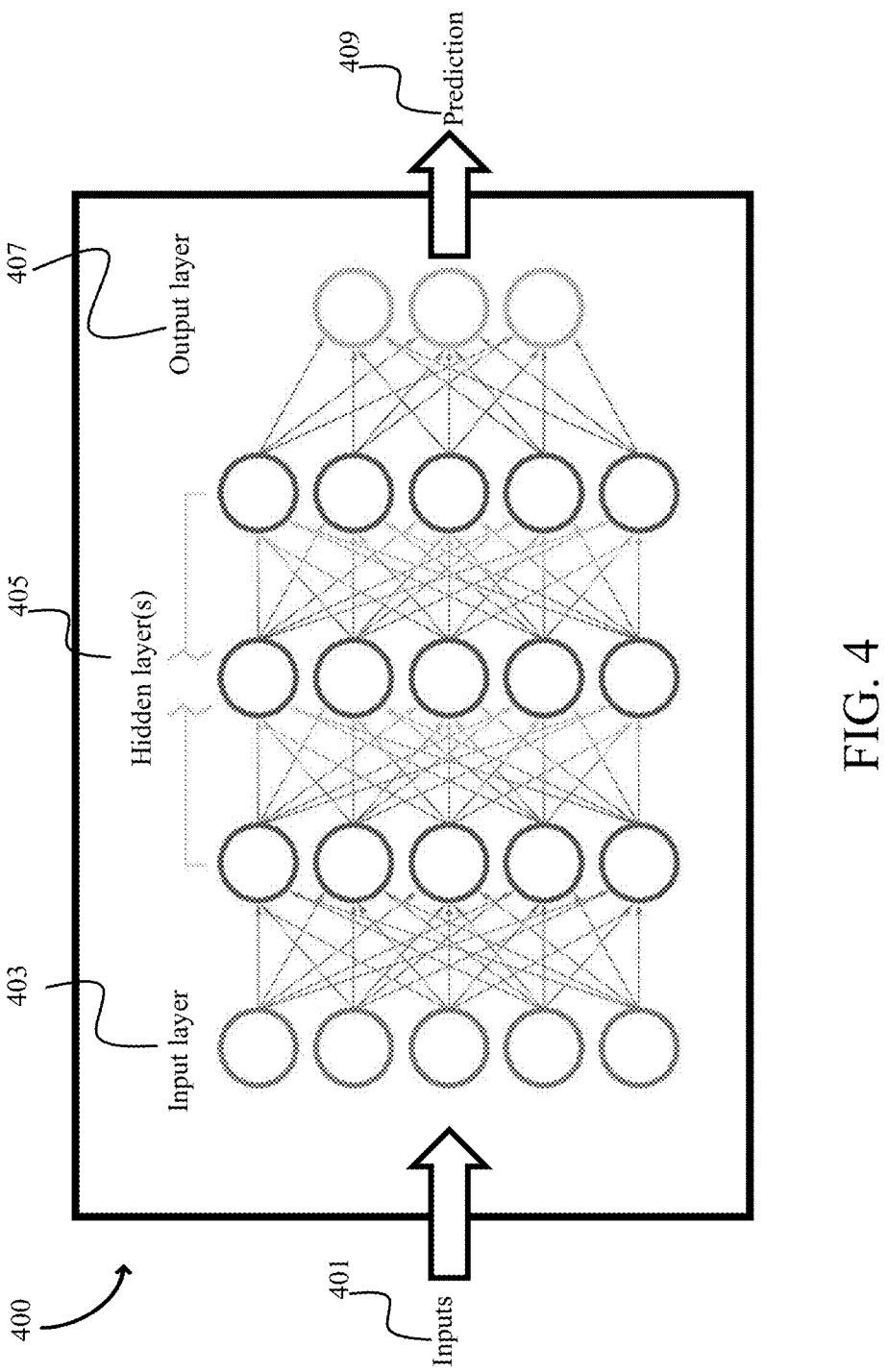
FIG. 4 illustrates a schematic of a deep neural network used as the prediction model (i.e., the learned function), according to some embodiments of the present disclosure.

FIG. 4 shows a schematic of a deep neural network 400 used as the prediction model (i.e., the learned function), according to some embodiments of the present disclosure. From data collected for training, an input signal 401 is provided to the deep neural network 400 through an input layer 403. The input layer 403 is a feature extraction layer and may be linear or comprise convolutional filters in order to extract useful characteristics from the input signal 401. For a linear input layer, transformation is linear, and a feature $$f_0 = W_0^T X + w_0 \tag{4a}$$

where $W_0$ and $w_0$ form weights and biases of the input layer 403 and X is the input to the deep neural network 400. Consequently, the features are passed through hidden layers 405, and they are transformed via activation functions $a(\cdot)$ such as rectified linear units (ReLUs), sigmoid functions, or modifications and combinations thereof. Operations occurring in the hidden layers 405 can be represented using compositions of functions, where an output from a final hidden layer is given by $$f_n = a_n \circ \ldots \circ a_2(W_2^T a_1(W_1^T a_0(f_0) + w_1) + w_2). \tag{4b}$$

An output layer 407 is used here for regression and therefore, can be linear, so a prediction output 409 is $$Y = W_\infty^T f_n + w_\infty$$

and training the deep neural network 400 involves obtaining good values of the weights and biases in the input layer 403, in the output layer 407 and in each of the hidden layers 405.

Several reinforcement learning algorithms are used to train the prediction models (or learned function) for the initial trajectory, where another prediction model for the policy is obtained such that a cumulative sum of reward functions is maximized. The reinforcement learning algorithms may include Q-learning, a state-action-reward-state-action, a deep Q network, a deep deterministic policy gradient, an asynchronous actor-critic algorithm, a trust region policy optimization, and/or a proximal policy optimization.

Some embodiments are based on a recognition that the constraints can include static constraints, such as a wall of a building, and dynamic constraints, such as a moving obstacle changing its position in a function of time. Some embodiments are based on a recognition that if the static constraints are considered during the training of the learned function, presence of unknown dynamic constraints still can be managed by the convex optimization problem. This is because the dynamic constraints are less stringent with the added flexibility of the time domain. To that end, the constraints managed by the convex optimization problem can differ from the constraint used during the training of the learned function. Thus, the learned function is trained to penalize the violation of only the static constraint, and the convex optimization problem is solved subject to the static constraints and the dynamic constraints.

Further, some embodiments are based on recognition that stochastic uncertainty may be present in dynamics of the device due to nonlinearities, actuation mismatch, and unmodelled phenomena, and in the positions of the devices and the obstacles due to sensing limitations. In such a case, where the device dynamics include the stochastic uncertainties, the constraints are replaced by probabilistic safety constraints (also referred to as chance constraints). The optimization-based safety filter is configured to enforce the probabilistic safety constraints as hard constraints to ensure safety with a high probability. In an embodiment, the optimization-based safety filter enforces the probabilistic safety constraints based on convex chance approximations of the probabilistic safety constraints, as described in FIG. 5A, FIG. 5B, and FIG. 5C.

According to an embodiment, the convex optimization problem can be formulated as a convex quadratic program where a safe control action $u_{safe}^{(i)}(t|k)$ is sought for $1 \le i \le N_A$, $k \le t \le k+T$ for a planning horizon T and $N_A$ number of devices. Given the initial trajectory by the learned function, denoted by $u_{RL}^{(i)}(t|k)$ for $1 \le i \le N_A$, $k \le t \le k+T$, the convex quadratic program minimizes quadratic objective $$\sum_{t=k}^{k+T} \|u_{safe}(t|k) - u_{RL}(t|k)\|^2$$

subject to constraints arising from the dynamics (1a), control constraints on $u_{safe}(t|k)$, constraints on a resulting motion trajectory that perform the task or come closer to performing the task with a high user-specified likelihood within a time horizon T, and recursive feasibility constraints that ensure that the convex quadratic program is feasible at future time steps as well.

Some embodiments of the present disclosure consider a task of ensuring that an overall system having multiple devices is probabilistically collectively safe, a collection of constraints that ensures safe motion planning for the multiple devices. With a high user-specified likelihood, it is desired that all the devices, each with dynamics (1a), i) stay within a pre-determined environment bound, ii) do not collide with $N_O$ static obstacles located at $c_j$, $1 \le j \le N_O$ denotes nominal mean positions of the obstacles for all the $N_O$ obstacles with radii $\gamma_j$, $1 \le j \le N_O$ respectively, and iii) do not collide with each other given device radii $r_A$.

Figure 5A:
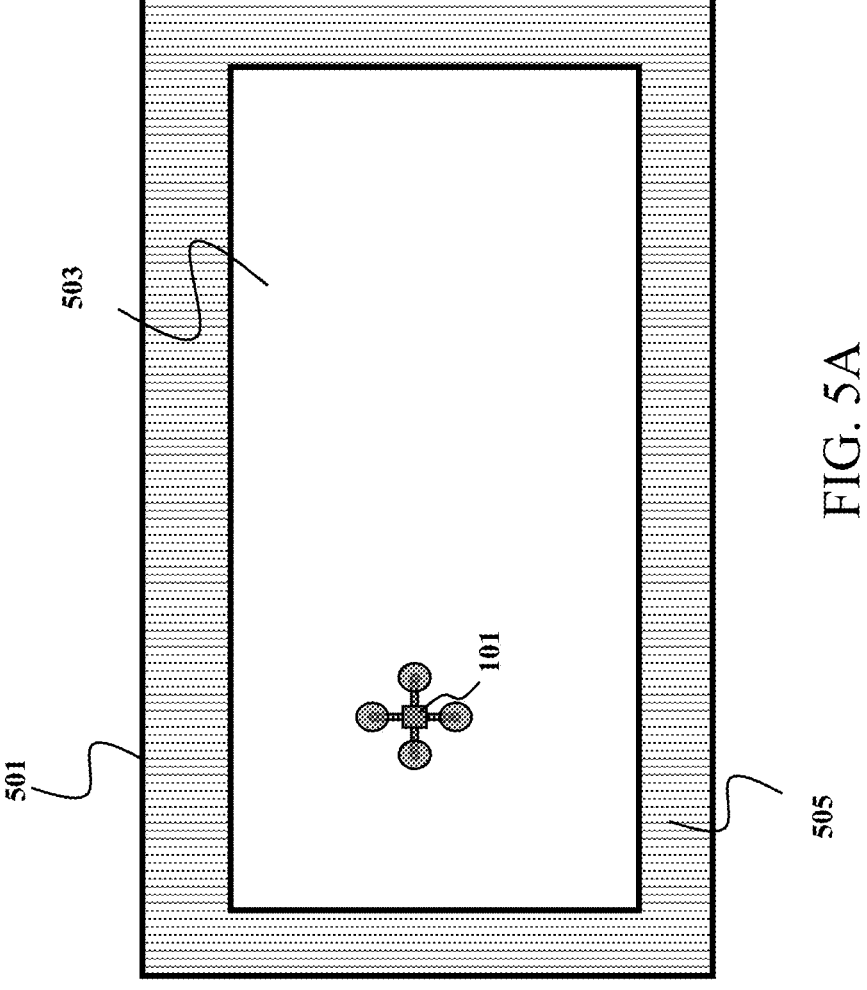
FIG. 5A illustrates a convex approximation of a constraint that requires the device to stay within a pre-determined environment polytope, according to some embodiments of the present disclosure.

FIG. 5A illustrates a convex approximation of the first constraint—the device 101 must stay within a pre-determined environment polytope 501, according to some embodiments of the present disclosure. The constraints are naturally convex for non-stochastic dynamics (1a) of the device 101. On the other hand, for the stochastic dynamics (1c) of the device 101, the device 101 is required to stay within a smaller set 503. Tightening of the environment polytope 501 by a tightened region 505 leads to formation of the smaller set 503, which arises due to stochasticity of the dynamics. Additionally, in some embodiments, similar convex approximations can be constructed for additional constraints on the state of the device 101 including its velocity.

Figure 5B:
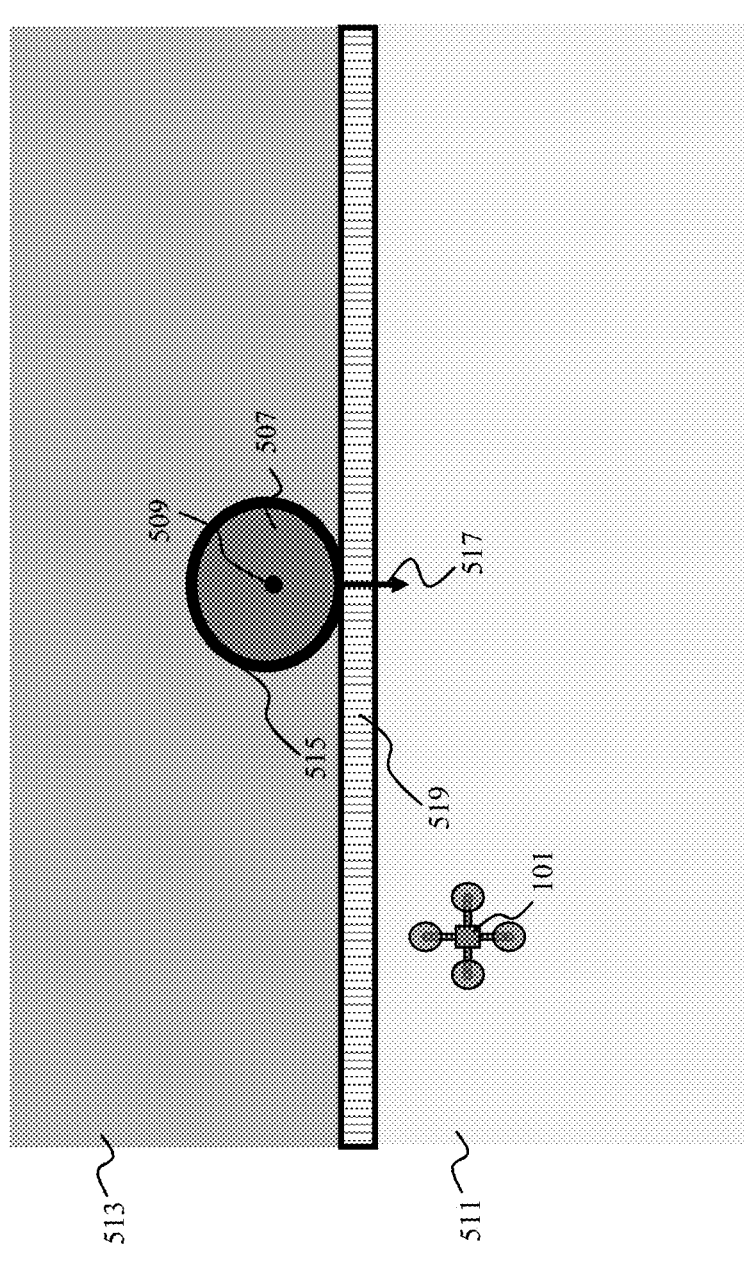
FIG. 5B illustrates a convex approximation of an obstacle avoidance constraint, according to some embodiments of the present disclosure.

FIG. 5B illustrates a convex approximation of the second constraint—do not collide with $N_O$ static obstacles, according to some embodiments of the present disclosure. A region 507 denotes a geometry of an obstacle j with a center 509

(denoted by $c_j$). The region 507 is avoided by the device 101 if the device position is in a linear halfspace 511 that is contained in a complement of a linear halfspace 513 including the region 507. The halfspace 511 is constructed from an obstacle border 515 and a normal vector 517 and tightened by a tightened region 519 to account for the stochastic uncertainty. The tightening required is explained in FIG. 5D.

Figure 5C:
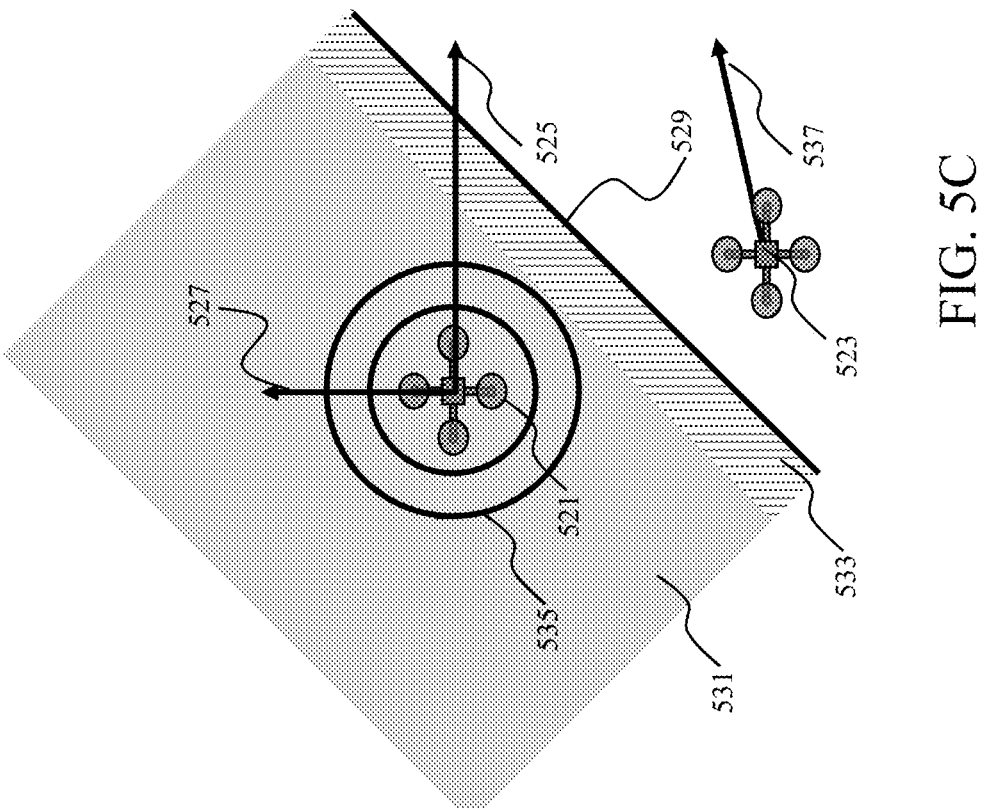
FIG. 5C illustrates a convex approximation of a device-device collision avoidance constraint, according to some embodiments of the present disclosure.

FIG. 5C illustrates a convex approximation of the third constraint—do not collide with other devices, according to some embodiments of the present disclosure. For example, it is required that devices 521 and 523 do not collide. A coordinate frame defined by axes 525 and 527 is attached to the device 521. Dynamics of the device 523 in the coordinate frame is given by $$x_{523-521}(k)=x_{523}(k)-x_{521}(k)$$

$$u_{523-521}(k)=u_{523}(k)-u_{521}(k)$$

$$w_{523-521}(k)=w_{523}(k)-\eta_{521}(k)$$

$$\eta_{523-521}(k)=\eta_{523}(k)-\eta_{521}(k)$$

$$x_{523-521}(k+1)=Ax_{523-521}(k)+Bu_{523-521}(k)+w_{523-521}(k) \tag{5a}$$

$$p_{523-521}(k)=Cx_{523-521}(k)+\eta_{523-521}(k), \tag{5b}$$

where $w_{523-521}(k)$ and $\eta_{523-521}(k)$ are process and measurement noise in the coordinate frame defined by the axes 525 and 527. For Gaussian $w$ and $\eta$, these noises are Gaussian. For device-device collision avoidance, the device 523 should stay below a boundary 529. The boundary 529 is obtained after growing a region 531 with a tightening region 533. The region 531 contains a device geometry 535, where a Minkowski sum of the device geometry 535 is considered with its negative image. A resulting motion 537 stays below the boundary 529 and avoids device-device collision.

Figure 5D:
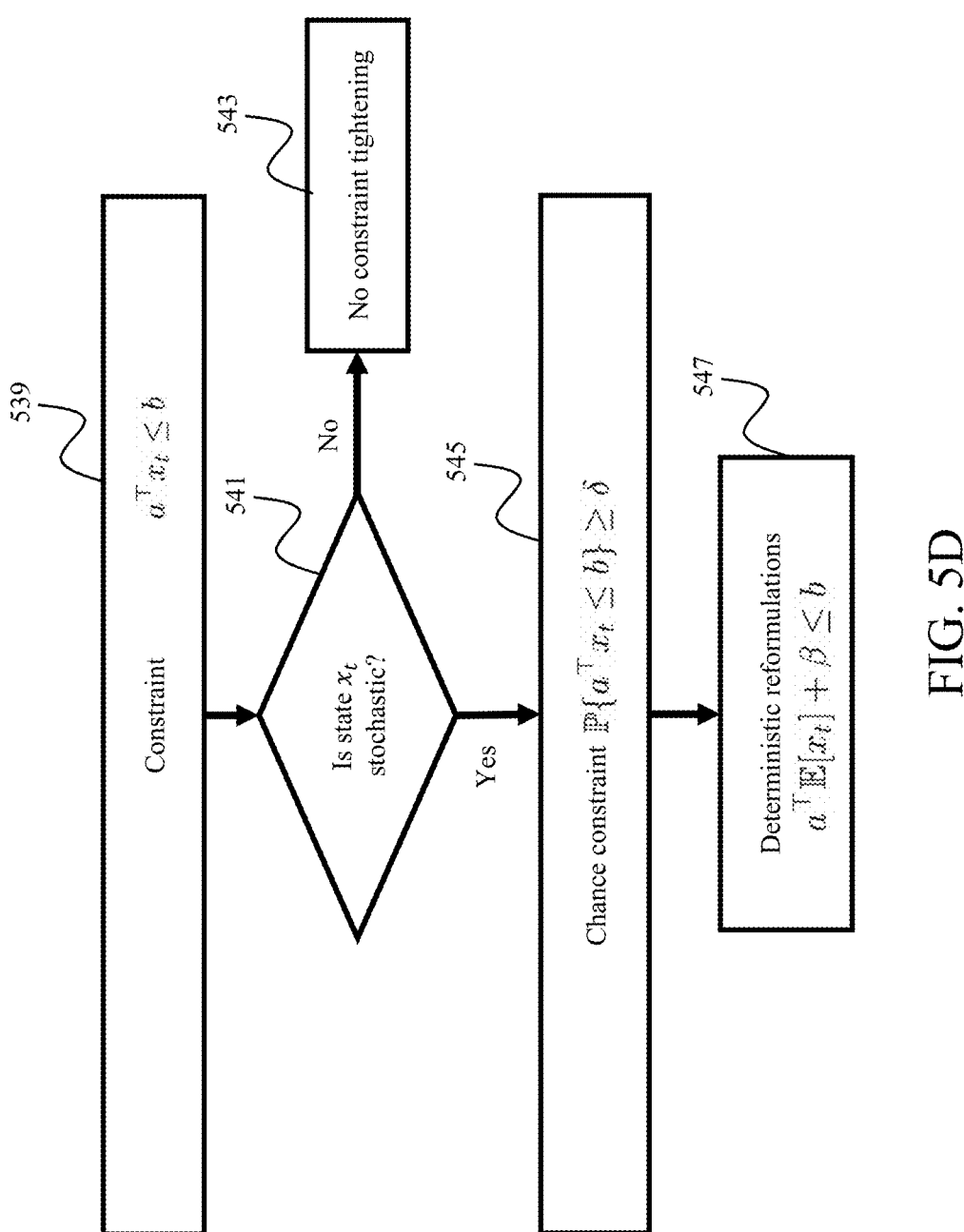
FIG. 5D shows a block diagram for formulation of a constraint on state $x_t$ of the device when the state $x_t$ is stochastic and non-stochastic, according to some embodiments of the present disclosure.

FIG. 5D shows a block diagram for formulation of a constraint 539 on state $x_t$ when $x_t$ is stochastic and non-stochastic, according to some embodiments of the present disclosure. At block 541, it is checked if the state $x_t$ is stochastic. If the state $x_t$ is non-stochastic, then constraint tightening is not required 543. On the other hand, if the state $x_t$ is stochastic, then the constraint 539 becomes a chance constraint 545 such that the constraint 539 holds with a likelihood no smaller than $\delta$. Consequently, the constraint 539 is tightened using a deterministic reformulation 547. Here, $\beta$ is the tightening required on the constraint 539 when applied to a mean state $\mathbb{E}[x_t]$. For Gaussian $x_t$, $\beta=\Phi^{-1}(\delta)\sqrt{a^T\Sigma a}$.

To that end, some embodiments of the present disclosure are based on the realization that the constraints do not require tightening when the dynamics are non-stochastic, and they simplify to their original convex approximations in such an event.

Some embodiments are based on the realization that recursive feasibility constraints are required for practical implementation of the controller 111 in a model predictive paradigm. Specifically, mean positions of the devices are required to stay inside appropriately defined control invariant sets so that the devices can be controlled safely despite the stochastic uncertainty. An example of the control invariant set is described below in FIG. 6.

Figure 6:
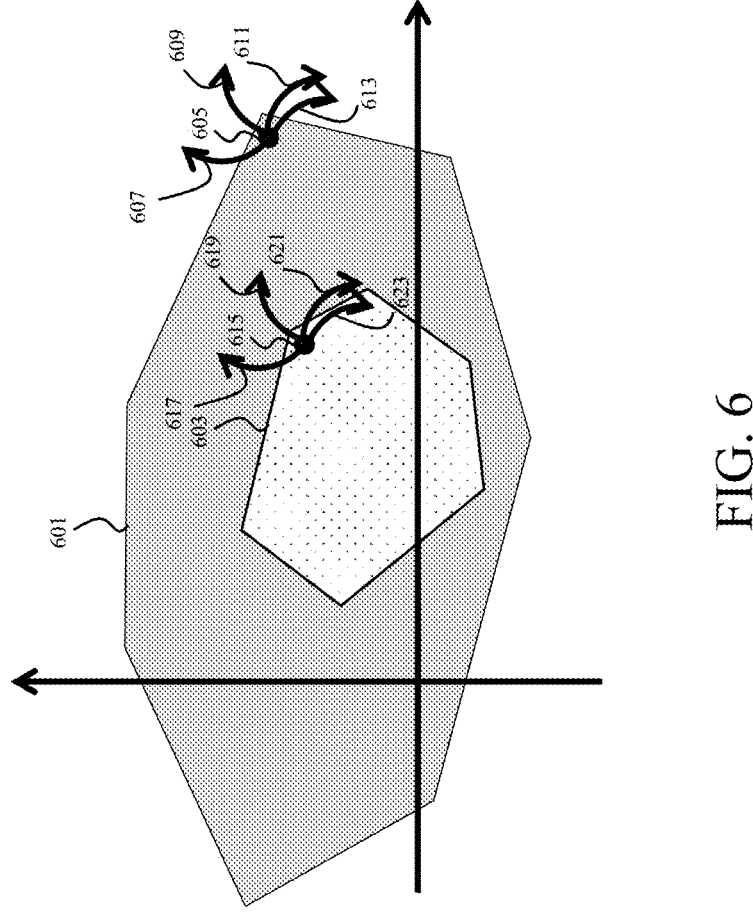
FIG. 6 shows an example of a two-dimensional projection of a control-invariant set corresponding to a constraint set, according to an embodiment of the present disclosure.

FIG. 6 shows an example of a two-dimensional projection of a control-invariant set 603 corresponding to a constraint set 601, according to an embodiment of the present disclosure. In an embodiment, the constraint set 601 may be a multi-dimensional polytope determined by hyperplanes, which are represented by linear inequalities, along multiple dimensions corresponding to the constraints on the optimal trajectory of the device 101. The constraint set 601 encodes the states of the device 101 that are safe. Any state of the device 101 within the control invariant set 603, there exists a control command maintaining the state of the device 101 within the control invariant set 603 for known or admissible future states.

For example, for any state of the device 101 such as a state 615 within the control invariant set 603 and within all possible control commands 617-623 that the controller 111 can execute, there is at least one control command 623 that maintains the state of the device 101 within the control invariant set 603. On the other hand, a state 605 can be feasible for one iteration, but all control commands 607-613 that the controller 111 is allowed to take during the next iteration can bring the state of the device 101 outside of the constraint set 601. Examples of the constraint set 601 include the convex approximations of the admissible workspace as discussed in FIGS. 5A, 5B, and 5C.

FIG. 7 shows a block diagram of a method 700 for controlling motion of a device from an initial state to a target state in an environment having obstacles, according to an embodiment of the present disclosure. At block 701, the method 700 obtaining parameters of the task from the device 101 and/or a remote server. The parameters of the task include the state of the device 101. In some embodiments, the parameters may include constraints that characterize the task, for example, one or a combination of the initial state of the device 101, the target state of the device 101, a geometrical configuration of one or multiple stationary obstacles defining at least a part of the constraint, and motion of moving obstacles defining at least a part of the constraint. Further, the parameters are submitted to a learned function.

At block 703, the method 700 includes executing the learned function trained with machine learning to produce an initial trajectory connecting the initial state of the device with the target state of the device. According to an embodiment, the learned function is a neural network trained using a reinforcement learning based on a reward function that penalizes an extent of violation of the constraints. At block 705, the method 700 includes solving a convex optimization problem subject to the constraints to produce an optimal trajectory that minimizes deviation from the initial trajectory. In an embodiment, an optimization based safety filter solves the convex optimization problem subject to the constraints as hard constraints, to produce the optimal trajectory. At block 707, the method 700 includes controlling the motion of the device 101 according to the optimal trajectory.

Figure 8:
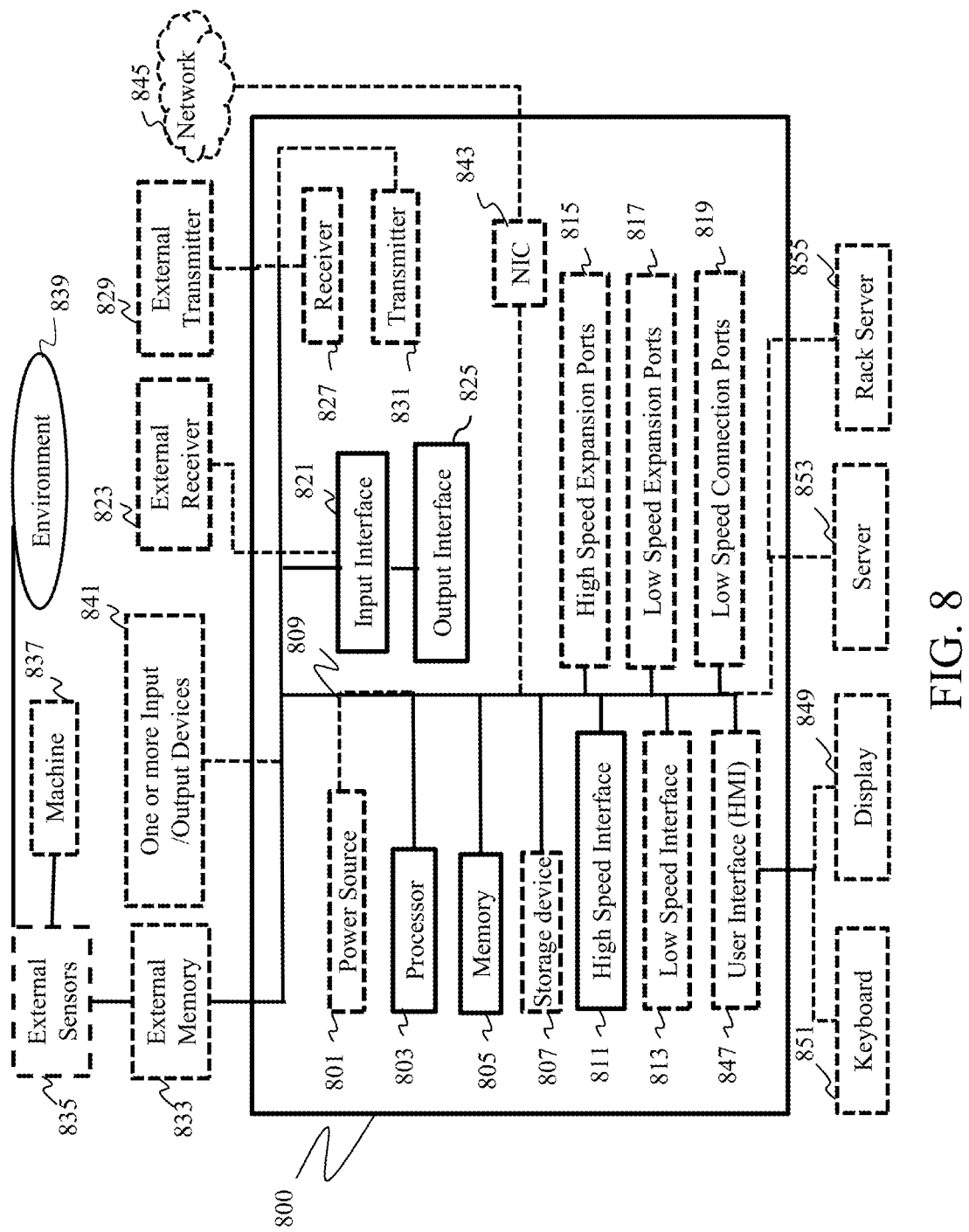
FIG. 8 is a schematic illustrating a computing device for implementing the methods and systems/controllers of the present disclosure.

FIG. 8 is a schematic illustrating a computing device 800 for implementing the methods and systems/controllers of the present disclosure. The computing device 800 includes a power source 801, a processor 803, a memory 805, a storage device 807, all connected to a bus 809. Further, a high-speed interface 811, a low-speed interface 813, high-speed expansion ports 815 and low speed connection ports 819, can be connected to the bus 809. In addition, a low-speed expansion port 817 is in connection with the bus 809. Further, an input interface 821 can be connected via the bus 809 to an external receiver 823 and an output interface 825. A receiver 827 can be connected to an external transmitter 829 and a transmitter 831 via the bus 809. Also connected to the bus 809 can be an external memory 833, external sensors 835, machine(s) 837, and an environment 839. Further, one or more external input/output devices 841 can be connected to the bus 809. A network interface controller (NIC) 843 can be adapted to connect through the bus 809 to a network 845, wherein data or other data, among other things, can be rendered on a third-party display device, third party imaging device, and/or third-party printing device outside of the computing device 800.

The memory 805 can store instructions that are executable by the computing device 800 and any data that can be utilized by the methods and systems of the present disclosure. The memory 805 can include random access memory (RAM), read only memory (ROM), flash memory, or any other suitable memory systems. The memory 805 can be a volatile memory unit or units, and/or a non-volatile memory unit or units. The memory 805 may also be another form of computer-readable medium, such as a magnetic or optical disk.

The storage device 807 can be adapted to store supplementary data and/or software modules used by the computer device 800. The storage device 807 can include a hard drive, an optical drive, a thumb-drive, an array of drives, or any combinations thereof. Further, the storage device 807 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 803), perform one or more methods, such as those described above.

The computing device 800 can be linked through the bus 809, optionally, to a display interface or user Interface (HMI) 847 adapted to connect the computing device 800 to a display device 849 and a keyboard 851, wherein the display device 849 can include a computer monitor, camera, television, projector, or mobile device, among others. In some implementations, the computer device 800 may include a printer interface to connect to a printing device, wherein the printing device can include a liquid inkjet printer, solid ink printer, large-scale commercial printer, thermal printer, UV printer, or dye-sublimation printer, among others.

The high-speed interface 811 manages bandwidth-intensive operations for the computing device 800, while the low-speed interface 813 manages lower bandwidth-intensive operations. Such allocation of functions is an example only. In some implementations, the high-speed interface 811 can be coupled to the memory 805, the user interface (HMI) 847, and to the keyboard 851 and the display 849 (e.g., through a graphics processor or accelerator), and to the high-speed expansion ports 815, which may accept various expansion cards via the bus 809.

In an implementation, the low-speed interface 813 is coupled to the storage device 807 and the low-speed expansion ports 817, via the bus 809. The low-speed expansion ports 817, which may include various communication ports (e.g., USB, Bluetooth, Ethernet, wireless Ethernet) may be coupled to the one or more input/output devices 841. The computing device 800 may be connected to a server 853 and a rack server 855. The computing device 800 may be implemented in several different forms. For example, the computing device 800 may be implemented as part of the rack server 855.

The description provides exemplary embodiments only and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A controller for controlling a motion of a device from an initial state to a target state in an environment having obstacles forming constraints on the motion of the device, the controller comprising: a processor; and a memory having instructions stored thereon that, when executed by the processor, cause the controller to:

execute a learned function trained with machine learning to generate a feasible or infeasible trajectory connecting the initial state of the device with the target state of the device while penalizing an extent of violation of at least some of the constraints to produce an initial trajectory, wherein the learned function is a neural network trained using reinforcement learning based on a reward function that penalizes the extent of violation of the constraints while allowing to produce the infeasible trajectory;

solve a convex optimization problem subject to the constraints to produce an optimal trajectory that minimizes deviation from the initial trajectory; and control the motion of the device according to the optimal trajectory, wherein the environment comprises multiple devices with a respective target state associated with each of the multiple devices, wherein the learned function is formulated for each of the multiple devices, and wherein the controller is further configured to:

execute the learned function for each device of the multiple devices to determine an initial trajectory for each device;

solve a joint-optimization problem to simultaneously determine an optimal trajectory of each device, wherein the optimal trajectory of each device minimizes deviation of the optimal trajectory of the corresponding device from the corresponding initial trajectory; and control motion of each device based on the corresponding optimal trajectory to achieve the corresponding target state of each device.

2. The controller of claim 1, wherein the constraints comprise at least: a constraint of reaching the target state of the device, a device-obstacle collision avoidance constraint, an inter-device collision avoidance constraint, and a keep-in constraint.

3. The controller of claim 1, wherein the constraints comprise at least: a static constraint with a fixed location and a dynamic constraint with a location varying in time, wherein the learned function is trained to penalize the violation of only the static constraint, and wherein the convex optimization problem is solved subject to the static constraint and the dynamic constraint.

4. The controller of claim 1, wherein the constraints are enforced as hard constraints, based on a convex approximation of each constraint.

5. The controller of claim 1, wherein the constraints are enforced as hard constraints, when dynamics of the device include stochastic uncertainty.

6. The controller of claim 5, wherein the constraints are enforced as hard constraints, based on a convex chance approximation of each constraint.

7. The controller of claim 1, wherein the device corresponds to at least one of: an autonomous vehicle, a mobile robot, an aerial vehicle, a water surface vehicle, and an underwater vehicle.

8. A method for controlling a motion of a device from an initial state to a target state in an environment having obstacles forming constraints on the motion of the device, the method comprising:

executing a learned function trained with machine learning to generate a feasible or infeasible trajectory connecting the initial state of the device with the target state of the device while penalizing an extent of violation of at least some of the constraints to produce an initial trajectory, wherein the learned function is a neural network trained using reinforcement learning based on a reward function that penalizes the extent of violation of the constraints while allowing to produce the infeasible trajectory;

solving a convex optimization problem subject to the constraints to produce an optimal trajectory that minimizes deviation from the initial trajectory; and controlling the motion of the device according to the optimal trajectory, wherein the environment comprises multiple devices with a respective target state, wherein the learned function is formulated for each of the multiple devices, and wherein the method further comprises:

executing the learned function of each device to determine an initial trajectory for each device;

solving a convex optimization problem of each device to determine an optimal trajectory for each device, wherein the optimal trajectory of each device minimizes deviation of the optimal trajectory from the corresponding initial trajectory; and controlling motion of each device based on the corresponding optimal trajectory to achieve the corresponding target state of each device.

9. The method of claim 8, wherein the constraints comprise at least: a constraint of reaching the target state of the device, a device-obstacle collision avoidance constraint, an inter-device collision avoidance constraint, and a keep-in constraint.

10. The method of claim 8, wherein the constraints comprise at least: a static constraint with a fixed location and a dynamic constraint with a location varying in time, wherein the learned function is trained to penalize the violation of only the static constraint, and wherein the convex optimization problem is solved subject to the static constraint and the dynamic constraint.

11. The method of claim 8, wherein the device corresponds to at least one of: an autonomous vehicle, a mobile robot, an aerial vehicle, a water surface vehicle, and an underwater vehicle.

12. A non-transitory computer-readable storage medium embodied thereon a program executable by a processor for performing a method for controlling a motion of a device from an initial state to a target state in an environment having obstacles forming constraints on the motion of the device, the method comprising:

executing a learned function trained with machine learning to generate a feasible or infeasible trajectory connecting the initial state of the device with the target state of the device while penalizing an extent of violation of at least some of the constraints to produce an initial trajectory, wherein the learned function is a neural network trained using reinforcement learning based on a reward function that penalizes the extent of violation of the constraints while allowing to produce the infeasible trajectory;

solving a convex optimization problem subject to the constraints to produce an optimal trajectory that minimizes deviation from the initial trajectory; and controlling the motion of the device according to the optimal trajectory, wherein the environment comprises multiple devices with a respective target state associated with each of the multiple devices, wherein the learned function is formulated for each of the multiple devices, and wherein the method further comprises:

executing the learned function for each device of the multiple devices to determine an initial trajectory for each device;

solving a joint-optimization problem to simultaneously determine an optimal trajectory of each device, wherein the optimal trajectory of each device minimizes deviation of the optimal trajectory of the corresponding device from the corresponding initial trajectory; and controlling motion of each device based on the corresponding optimal trajectory to achieve the corresponding target state of each device.

* * * * *